(12) United States Patent
Janz et al.

(10) Patent No.: US 7,028,021 B2
(45) Date of Patent: Apr. 11, 2006

(54) AGGREGATING DEVICE COLLECTION DATA

(75) Inventors: Susan M. Janz, Eagle, ID (US); Donald J. Gathman, Boise, ID (US); Burton H. Poppenga, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 85 days.

(21) Appl. No.: 09/775,109

(22) Filed: Jan. 31, 2001

(65) Prior Publication Data
US 2002/0103791 A1 Aug. 1, 2002

(51) Int. Cl.
G06F 17/30 (2006.01)

(52) U.S. Cl. .................... 707/1; 707/2; 707/6

(58) Field of Classification Search ............... 707/1–6, 707/7, 10, 100, 104.1, 200, 500.1, 524; 705/10; 715/500.1, 524; 709/220
See application file for complete search history.

(56) References Cited

U.S. PATENT DOCUMENTS 5,552,776 A * 9/1996 Wade et al. ............... 340/5.74

2002/0035697 A1 * 3/2002 McCurdy et al. ........... 713/200
2002/0060246 A1 * 5/2002 Gobburu et al. ......... 235/462.46
2002/0151992 A1 * 10/2002 Hoffberg et al. ............. 700/83

* cited by examiner

Primary Examiner—Alford W. Kindred

(57) ABSTRACT

Data is transferred from an input record to an index. The input record has a recorded unique device identification and recorded device data for a device, such as a printer. The recorded unique device identification is either a serial number of the device or another persistent identifying designation for the device. The recorded device data includes recorded usage data for the device. The index has at least one enduring record. Each enduring record has an enduring unique device identification and enduring device data. The recorded unique device identification and recorded device data for a device are read from the input record. The index is searched for a match to the recorded unique device identification. If a match to the recorded device information is not found in the index, an enduring record for the device is created in the index. An enduring usage data is read from the index. A difference in usage data is calculated from the enduring usage data and the recorded usage data. The index is updated with the recorded device data. The index is updated with the recorded device data by replacing enduring device data from the index with the recorded device data. The updates to the index are tracked.

27 Claims, 2 Drawing Sheets

AGGREGATING DEVICE COLLECTION DATA

FIELD OF THE INVENTION

This invention relates in general to data aggregation and, more particularly, to securely aggregating device data.

BACKGROUND OF THE INVENTION

Data has been collected for many reasons and put to many purposes. It is often desirable to aggregate collected data in order to discern changes. For example, many modern printers record running usage data over the lifetime of the device. This usage data may be accessed periodically to discern how many pages have been printed between access times.

Many conventional data collection and aggregation techniques have included manual collection of data and input of the data into a database. Both manual collection and data entry are time consuming, labor intensive, and prone to human error.

Automated collection and entry techniques have been developed to overcome these shortcomings of manual collection and entry. Conventional data collection and entry techniques receive data into a database where the data may be manipulated to achieve a desired output. Although these conventional automated techniques reduce the time and labor required for data collection and entry, errors still frequently occur.

One of the main causes of error in these conventional techniques is the lack of accuracy and integrity controls. For example, if data is repeatedly received from a device having a particular address and the address is subsequently assigned to a different device, inaccurate data may be recorded.

Furthermore, conventional data collection and entry techniques are usually not portable. That is, the collection database must be able to directly access the devices having the data to be recorded. Often, such access is not convenient, desirable, or possible. In such cases, it would be more desirable to have a data collection tool that has access to the devices. The data collection tool may then record the information and transfer a record of the information to a managing tool for aggregation into a database.

SUMMARY OF THE INVENTION

According to principles of the present invention, data is transferred from an input record to an index. The input record has recorded unique device identification and recorded device data for a device, such as a printer. The recorded unique device identification is either a serial number of the device or another persistent identifying designation for the device. The recorded device data includes recorded usage data for the device. The index has at least one enduring record. Each enduring record has an enduring unique device identification and enduring device data. The recorded unique device identification and recorded device data for a device are read from the input record. The index is searched for a match to the recorded unique device identification. The index is updated with the recorded device data. The index is updated with the recorded device data by replacing enduring device data from the index with the recorded device data.

According to further principles of the present invention, if a match to the recorded device information is not found in the index, an enduring record for the device is created in the index.

According to further principles of the present invention, enduring usage data is read from the index. A difference in usage data is calculated from the enduring usage data and the recorded usage data.

According to further principles of the present invention, the updates to the index are tracked.

DETAILED DESCRIPTION OF THE INVENTION

Figure 1:
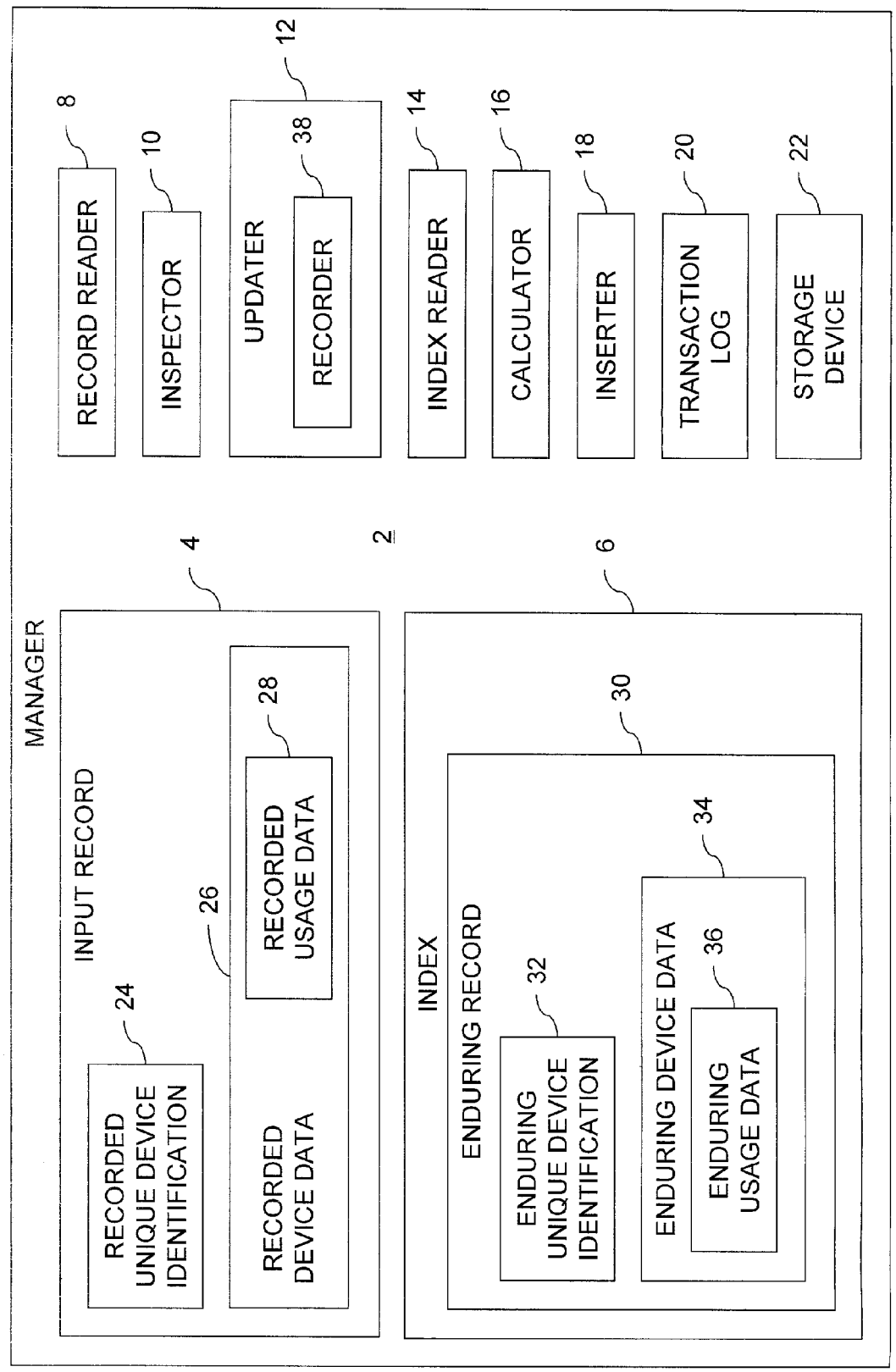
FIG. 1 is a block diagram representing one embodiment of the system of the present invention for transferring data.

Illustrated in FIG. 1 is a block diagram illustrating a data transfer manager 2. Manager 2 includes input record 4, index 6, record reader 8, inspector 10, updater 12 and, optionally, index reader 14, calculator 16, inserter 18, transaction log 20, and storage device 22. Although depicted as integral to manager 2, input record 4, index 6, record reader 8, inspector 10, updater 12, index reader 14, calculator 16, inserter 18, transaction log 20, and storage device 22 are alternatively embodied separate from manager 2 and accessible by manager 2.

Input record 4 includes recorded unique device identification 24 and recorded device data 26. Recorded unique device identification 24 is an identification indicia for a device (not shown). Examples of recorded unique device identification 24 include a serial number and a hardware address of the device.

It is not uncommon for a device to be removed from a collection, or fleet, of devices and reassigned elsewhere. In such cases, it is desirable that the identification indicia, for identifying the device, change from the first deployment to the next deployment. One embodiment for accomplishing a change in identification indicia includes combining an identification code and either the serial number or hardware address of the device. The identification code may change with each deployment while the serial number and hardware address remain constant. The result is identification indicia that changes with each deployment.

Recorded device data 26 is any data concerning the device that may be desirable to include in index 6. For example, if the device handles pages of media, such as paper, recorded device data 26 may include a recorded usage data 28 of paper handled. Examples of recorded usage data 28 include total pages handled, total color pages output, and total black and white pages output.

Index 6 is any index for aggregating data. Examples of index 6 include a database, a spreadsheet, a table, a list, and a file. Index 6 includes at least one enduring record 30. Each enduring record 30 represents data from one device. Each enduring record 30 includes an enduring unique device identification 32 and enduring device data 34.

Enduring unique device identification 32 is of the same type as recorded unique device identification 24. For example, if recorded unique device identification 24 is a serial number of the device, enduring unique device identification 32 is also a serial number of the device.

Enduring device data 34 is of the same type as recorded device data 26. For example, if recorded device data 26 includes recorded usage data 28, enduring device data 34 includes enduring usage data 36.

Record reader 8 is any combination of hardware and executable code configured to read, from input record 4, recorded unique device identification 24 and recorded device data 26.

Inspector 10 is any combination of hardware and executable code configured to search index 6 for an enduring unique device identifications 32 matching recorded unique device identification 24.

Updater 12 is any combination of hardware and executable code configured to update index 6 with recorded device data 26. In more detail, updater 12 is configured to update enduring device data 34 from the enduring record 30 having the enduring unique device identification 32 matching the recorded unique device identification 24.

In one embodiment, updater 12 includes recorder 38. Recorder 38 is any combination of hardware and executable code configured to replace enduring device data 34 with recorded device data 26.

Index reader 14 is any combination of hardware and executable code configured to read enduring usage data 36 from the enduring record 30 having the enduring unique device identification 32 matching the recorded unique device identification 24.

Calculator 16 is any combination of hardware and executable code configured to calculate a difference in usage data from enduring usage data 34 and recorded usage data 28. In one embodiment, calculator 16 subtracts enduring usage data 34 from recorded usage data 28 to yield the difference in usage data.

Inserter 18 is any combination of hardware and executable code configured to respond to a failure to find a match to recorded unique device identification 24 by creating, in index 6, an enduring record 30 for the device referenced by recorded unique device identification 24.

Transaction log 20 is any combination of hardware, data, and executable code configured to track updates to index 6.

Storage device 22 is any device for storing data or executable code. Storage device 22 may also be a program storage device tangibly embodying a program, applet or instructions executable by manager 2 for performing the method steps of the present invention executable by manager 2. Storage device 22 may be any type of storage media such as magnetic, optical, or electronic storage media.

Figure 2:
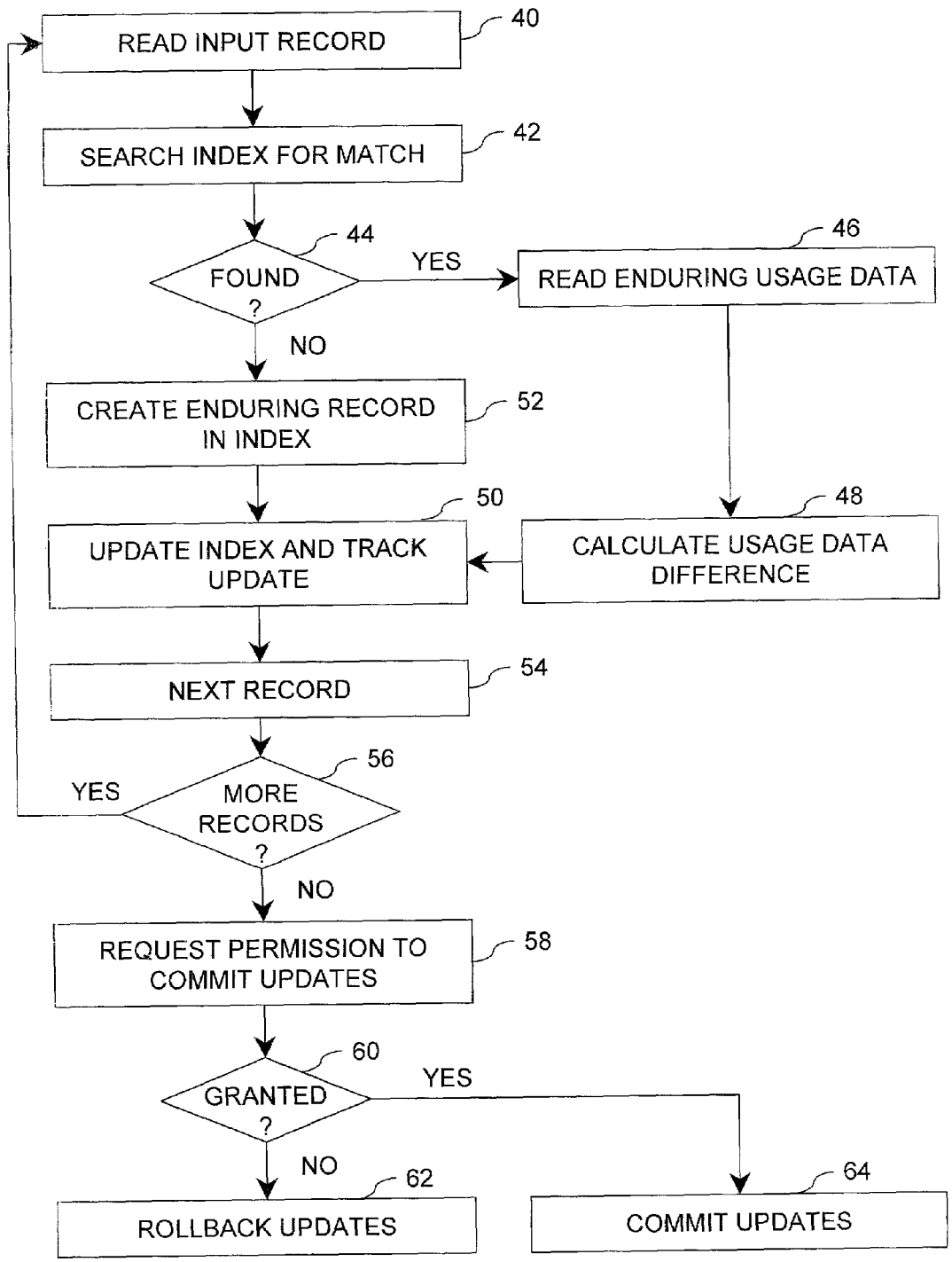
FIG. 2 is a flow chart illustrating one embodiment of the method of the present invention for transferring data.

FIG. 2 is a flow chart representing steps of one embodiment of the present invention. Although the steps represented in FIG. 2 are presented in a specific order, the present invention encompasses variations in the order of steps. Furthermore, additional steps may be executed between the steps illustrated in FIG. 2 without departing from the scope of the present invention.

Input record 4 is read 40 to learn the recorded unique device identification 24 and recorded device data 26. Alternatively, recorded device data 26 is read later.

Index 6 is searched 42 for a match to recorded unique device identification 24. In more detail, each enduring record 30 in index 6 is searched 42 for an enduring unique device identification 32 that matches recorded unique device identification 24. If a match is found 44, enduring usage data 36 is optionally read 46 and, together with recorded usage data 28, used to calculate 48 a usage data difference. The usage data difference may be used to determine how many pages were handled by the device since a previous update.

Regardless of whether a usage data difference is calculated 48, index 6 is updated 50 and the update is optionally tracked. In one embodiment, index 6 is updated 50 by replacing enduring device data 34 with recorded device data 26. In an alternative embodiment, index 6 is updated 50 by combining enduring device data 34 with recorded device data 26.

If no match is found for recorded unique device identification 24 in index 6, an enduring record 30 is created 52, in index 6, for the device represented by recorded unique device identification 24. The newly created enduring record 30 is then updated 50.

After enduring record 30 is updated, another input record 4 is selected 54. If there are more 56 input records 4, the process repeats until there are no more 56 input records 4. When there are no more 56 input records 4, optionally, permission to commit the updates is requested 58. If permission is granted 60, the updates are committed 64 Otherwise, the updates are rolled back 62. The updates may be rolled back by reviewing the tracked updates and reversing the updates. Optionally, the updates may also be rolled back 62 if errors have occurred in the process.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A computer implemented method for transferring data, the method comprising:

reading, from an input record, a recorded unique device identification to uniquely identify a device and recorded device usage data for the device;

searching an index for an enduring unique device identification matching the recorded unique device identification;

reading an enduring usage data from an enduring record in the index having enduring unique device identification matching the recorded unique device identification;

calculating a difference in usage data from the enduring usage data and the recorded usage data; and, updating the index with the recorded device usage data.

2. The method of claim 1 wherein updating the index with the recorded device usage data includes replacing enduring device data from the index with the recorded device usage data.

3. The method of claim 1 wherein updating the index with the recorded device usage data includes updating enduring device data from an enduring record in the index having enduring unique device identification matching the recorded unique device identification.

4. The method of claim 1 further including, responsive to a failure to find a match to the recorded unique device identification in the index, creating in the index an enduring record for the device.

5. The method of claim 1 further including tracking updates to the index.

6. A computer implemented system for transferring data, the system comprising:

an input record for a device, the input record having a recorded unique device identification to uniquely identify the device and recorded device usage data for the device;

a record reader configured to read, from the input record, the recorded unique device identification and the recorded device usage data for the device;

an index having at least one enduring record, each enduring record having an enduring unique device identification and enduring device data including an enduring usage data;

an inspector configured to search the index for one of the enduring unique device identifications matching the recorded unique device identification;

an index reader configured to read the enduring usage data from the enduring record having the enduring unique device identification matching the recorded unique device identification; and, a calculator configured to calculate a difference in usage data from the enduring usage data and the recorded usage data; and, an updater configured to update the index with the recorded device usage data.

7. The system of claim 6 wherein the updater includes a recorder configured to replace enduring device data from the index with the recorded device usage data.

8. The system of claim 6 wherein the at least one enduring record further includes enduring device data and the updater is further configured to update the enduring device data from the enduring record having the enduring unique device identification matching the recorded unique device identification.

9. The system of claim 6 further including an inserter configured to respond to a failure to find a match to the recorded unique device identification in the index by creating, in the index, an enduring record for the device.

10. The system of claim 6 further including a transaction log configured to track updates to the index.

11. A program storage device readable by a computer, tangibly embodying a program, applet, or instructions executable by the computer to perform method steps for transferring data, the method steps comprising:

reading, from an input record, a recorded unique device identification to uniquely identify the device and recorded device usage data for a device;

searching an index for an enduring unique device identification matching the recorded unique device identification;

reading an enduring usage data from an enduring record in the index having enduring unique device identification matching the recorded unique device identification;

calculating a difference in usage data from the enduring usage data and the recorded usage data; and, updating the index with the recorded device usage data.

12. The program storage device of claim 11 wherein the method step of updating the index with the recorded device usage data includes replacing enduring device data from the index with the recorded device usage data.

13. The program storage device of claim 11 wherein the method step of updating the index with the recorded device usage data includes updating enduring device data from an enduring record in the index having enduring unique device identification matching the recorded unique device identification.

14. The program storage device of claim 11 wherein the method steps further include, responsive to a failure to find a match to the recorded unique device identification in the index, creating in the index an enduring record for the device.

15. The program storage device of claim 11 wherein the method steps further include tracking updates to the index.

16. A computer implemented method for transferring data, the method comprising:

reading, from an input record, a recorded unique device identification to uniquely identify a device and recorded device usage data for the device;

searching an index for an enduring unique device identification matching the recorded unique device identification; and, updating the index with the recorded device usage data, wherein updating the index with the recorded device usage data includes updating enduring device data from an enduring record in the index having enduring unique device identification matching the recorded unique device identification.

17. The method of claim 16 further including:

reading an enduring usage data from an enduring record in the index having enduring unique device identification matching the recorded unique device identification; and, calculating a difference in usage data from the enduring usage data and the recorded usage data.

18. The method of claim 16 further including, responsive to a failure to find a match to the recorded unique device identification in the index, creating in the index an enduring record for the device.

19. The method of claim 16 further including tracking updates to the index.

20. A computer implemented system for transferring data, the system comprising:

an input record for a device, the input record having a recorded unique device identification to uniquely identify the device and recorded device usage data for the device;

a record reader configured to read, from the input record, the recorded unique device identification and the recorded device usage data for the device;

an index having at least one enduring record, each enduring record having an enduring unique device identification and enduring device data;

an inspector configured to search the index for one of the enduring unique device identifications matching the recorded unique device identification; and, an updater configured to update the index with the recorded device usage data and to update the enduring device data from the enduring record having the enduring unique device identification matching the recorded unique device identification.

21. The system of claim 20 wherein the at least one enduring record further includes enduring device data and the enduring device data includes an enduring usage data and further including:

an index reader configured to read the enduring usage data from the enduring record having the enduring unique device identification matching the recorded unique device identification; and, a calculator configured to calculate a difference in usage data from the enduring usage data and the recorded usage data.

22. The system of claim 20 further including an inserter configured to respond to a failure to find a match to the recorded unique device identification in the index by creating, in the index, an enduring record for the device.

23. The system of claim 20 further including a transaction log configured to track updates to the index.

24. A program storage device readable by a computer, tangibly embodying a program, applet, or instructions executable by the computer to perform method steps for transferring data, the method steps comprising:

reading, from an input record, a recorded unique device identification to uniquely identify the device and recorded device usage data for a device;

searching an index for an enduring unique device identification matching the recorded unique device identification; and, updating the index with the recorded device usage data, wherein updating the index with the recorded device usage data includes updating enduring device data from an enduring record in the index having enduring unique device identification matching the recorded unique device identification.

25. The program storage device of claim 24 wherein the method steps further include:

reading an enduring usage data from an enduring record in the index having enduring unique device identification matching the recorded unique device identification; and, calculating a difference in usage data from the enduring usage data and the recorded usage data.

26. The program storage device of claim 24 wherein the method steps further include, responsive to a failure to find a match to the recorded unique device identification in the index, creating in the index an enduring record for the device.

27. The program storage device of claim 24 wherein the method steps further include tracking updates to the index.

* * * * *